US012567677B2

(12) United States Patent
Choi et al.

(10) Patent No.: US 12,567,677 B2
(45) Date of Patent: Mar. 3, 2026

(54) ANTENNA INCLUDING DEICING DEVICE

(71) Applicant: INTELLIAN TECHNOLOGIES, INC., Pyeongtaek-si (KR)

(72) Inventors: Geun Ho Choi, Hwaseong-si (KR); Jong Wook Hwang, Yongin-si (KR); Sung Ho Hwang, Hwaseong-si (KR); Sung Man Jo, Hwaseong-si (KR)

(73) Assignee: INTELLIAN TECHNOLOGIES, INC., Pyeongtaek-si (KR)

( * ) Notice: Subject to any disclaimer, the term of this patent is extended or adjusted under 35 U.S.C. 154(b) by 135 days.

(21) Appl. No.: 18/683,622

(22) PCT Filed: May 11, 2022

(86) PCT No.: PCT/KR2022/006723
§ 371 (c)(1),
(2) Date: Feb. 14, 2024

(87) PCT Pub. No.: WO2023/022332
PCT Pub. Date: Feb. 23, 2023

(65) Prior Publication Data

US 2025/0141114 A1 May 1, 2025

(30) Foreign Application Priority Data

Aug. 18, 2021 (KR) ........................ 10-2021-0108530

(51) Int. Cl.
*H01Q 15/16* (2006.01)
*H01Q 1/02* (2006.01)
*H01Q 19/10* (2006.01)

(52) U.S. Cl.
CPC ............... *H01Q 15/16* (2013.01); *H01Q 1/02* (2013.01); *H01Q 19/10* (2013.01)

(58) Field of Classification Search
CPC ........... H01Q 1/02; H01Q 15/16; H01Q 19/10
See application file for complete search history.

(56) References Cited

U.S. PATENT DOCUMENTS 5,617,107 A * 4/1997 Fleming .................. H01Q 1/02 343/912
5,920,289 A * 7/1999 Jones .................. H01Q 15/144 239/548
5,963,171 A 10/1999 Jones

FOREIGN PATENT DOCUMENTS

JP 05-343916 A 12/1993
JP 10-261908 A 9/1998
(Continued)

OTHER PUBLICATIONS

International Search Report for PCT/KR2022/006723 dated Aug. 24, 2022.
(Continued)

*Primary Examiner* — Amal Patel
(74) *Attorney, Agent, or Firm* — MOSER TABOADA

(57) ABSTRACT

An antenna according to an embodiment comprises: a reflector, a transceiver disposed at one side of the reflector; and a support disposed at the other side of the reflector and serving to position the reflector apart from an installation position, wherein the reflector comprises: a reflective layer which reflects electromagnetic waves; a heating layer which is disposed on the lower surface of the reflective layer and generates heat for transfer to the top of the reflective layer; and a heat insulation layer which is disposed on the lower surface of the heating layer and serves to prevent heat generated in the heating layer from being transferred below the heating layer.

10 Claims, 5 Drawing Sheets

(56) References Cited

FOREIGN PATENT DOCUMENTS

| | | | | |
|---|---|---|---|---|
| JP | H10261908 | A | * | 9/1998 |
| JP | 2000-151265 | A | | 5/2000 |
| KR | 10-20030020167 | A | | 3/2003 |
| KR | 10-1757681 | B1 | | 7/2017 |

OTHER PUBLICATIONS

Supplementary European Search Report for Application No. 22858574.1 dated Aug. 8, 2025.

* cited by examiner

ANTENNA INCLUDING DEICING DEVICE

TECHNICAL FIELD

The following embodiments relate to an antenna including a deicing device.

BACKGROUND ART

An antenna is a transducer used to transmit or receive electromagnetic waves to or from a space. When transmitting, the antenna emits an alternating current voltage modulated by a transmitter as an electromagnetic wave into the atmosphere. Conversely, when receiving, the antenna converts an electromagnetic wave into an alternating current voltage evaluated by a transceiver.

When radio waves are received by the antenna, the radio waves are reflected and concentrated on the surface of a reflector corresponding to the frequency of the radio waves. Subsequently, the reflected and concentrated radio waves are received by a receiver. Therefore, it is crucial to maintain the surface condition of the reflector to precisely concentrate the radio waves onto the receiver.

Similarly, when the antenna transmits radio waves, the reflector also plays a role in concentrating the radiated radio waves, so it is still important to maintain the surface condition of the reflector.

Korean Patent Publication No. 10-1757681 discloses a satellite communication antenna capable of receiving multiband signals.

The above description is information the inventor acquired during the course of conceiving the present disclosure, or already possessed at the time, and was not necessarily publicly known before the present application was filed.

DISCLOSURE OF THE INVENTION

Technical Goals

An aspect according to an embodiment is to provide an antenna that may maintain the surface condition of a reflector by melting snow or ice accumulated on the reflector.

An aspect according to an embodiment is to provide an antenna that maintains the surface condition of a reflector while ensuring durability.

The technical aspects obtainable from the present disclosure are non-limited by the above-mentioned technical aspects, and other unmentioned technical aspects may be clearly understood from the following description by those having ordinary skill in the technical field to which the present disclosure pertains.

Technical Solutions

According to an embodiment, an antenna may include a reflector, a transceiver located on one side of the reflector and a support located on another side of the reflector and configured to locate the reflector at a distance from an installation position.

The reflector may include a reflective layer configured to reflect an electromagnetic wave, a heating layer located on a lower surface of the reflective layer and configured to generate heat to be transferred to an upper portion of the reflective layer, and an insulating layer located on a lower surface of the heating layer and configured to prevent the heat generated in the heating layer from being transferred to a lower portion of the heating layer.

Furthermore, the reflector may further include a reinforcement layer located on a lower surface of the insulating layer and configured to increase strength of the antenna.

Furthermore, the reflector may further include a first retention layer located on a lower surface of the reinforcement layer and configured to maintain strength and a shape of the reinforcement layer.

Furthermore, the reflector may further include an upper protective layer and a lower protective layer located on an upper surface of the reflective layer and a lower surface of the first retention layer and configured to prevent corrosion and discoloration of the antenna, an upper second retention layer located on an upper surface of the upper protective layer and configured to prevent deformation of the antenna due to an external force, and a lower second retention layer located on a lower surface of the lower protective layer and configured to prevent deformation of the antenna due to an external force.

The heating layer may include a heating wire portion configured to cover an entire area of the lower surface of the reflective layer, and the heating wire portion may include a heating wire with a plurality of concentric circular shapes.

Furthermore, the heating layer may include a heating wire portion configured to cover an entire area of a lower portion of the reflective layer, and the heating wire portion may include a plurality of sections including heating wires.

The heating wire portion may further include an additional heating wire corresponding to the heating wire, and the additional heating wire may be spaced apart to one side from the heating wire to which the additional heating wire corresponds.

The antenna may further include a controller electrically connected to the heating layer and configured to control heating of the heating layer, and the controller may include a sensor configured to measure temperature and a processing unit configured to perform an operation through data measured by the sensor.

Effects

According to an embodiment, an antenna may maintain the surface condition of a reflector by melting snow or ice accumulated on the reflector.

According to an embodiment, an antenna maintains the surface condition of a reflector while ensuring durability.

The effects of an antenna according to an embodiment may not be limited to the above-mentioned effects, and other unmentioned effects may be clearly understood from the following description by one of ordinary skill in the art.

Figure 1:
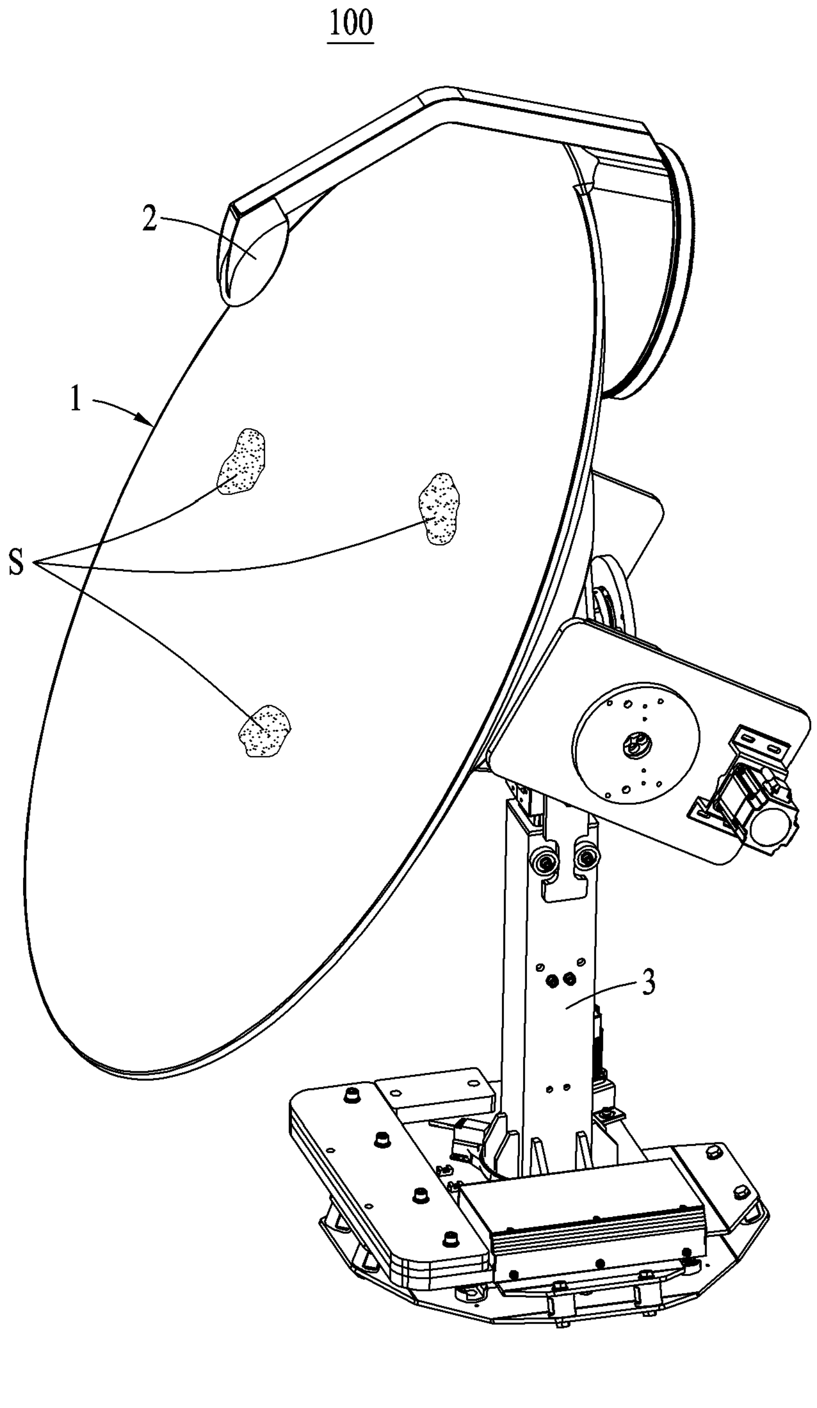
FIG. 1 is a perspective view of an antenna according to an embodiment.

The accompanying drawings illustrate preferred embodiments of the present disclosure, and are provided together with the detailed description for better understanding of the technical idea of the present disclosure. Therefore, the present disclosure should not be construed as being limited to the embodiments set forth in the drawings.

BEST MODE FOR CARRYING OUT THE INVENTION

Hereinafter, embodiments will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular examples only and is not to be limiting of the examples. The singular forms "a", "an", and "the" are intended to include the plural forms as well, unless the context clearly indicates otherwise. It will be understood that the terms "comprises/comprising" and/or "includes/including" when used herein, specify the presence of stated features, integers, steps, operations, elements, components, or combinations thereof, but do not preclude the presence or addition of one or more of other features, integers, steps, operations, elements, components, or combinations thereof.

Unless otherwise defined, all terms, including technical and scientific terms, used herein have the same meaning as commonly understood by one of ordinary skill in the art to which this disclosure pertains. It will be understood that terms, such as those defined in commonly-used dictionaries, should be interpreted as having a meaning that is consistent with their meaning in the context of the relevant art and will not be interpreted in an idealized or overly formal sense unless expressly so defined herein.

Furthermore, in the descriptions of the embodiments referring to the accompanying drawings, like reference numerals refer to like elements and any repeated description related thereto will be omitted. In the descriptions of the embodiments, detailed description of well-known related structures or functions will be omitted when it is deemed that such description will cause ambiguous interpretation of the present disclosure.

In addition, terms such as first, second, A, B, (a), (b), and the like may be used to describe components of the embodiments. Each of these terms is not used to define an essence, order, or sequence of corresponding components, but used merely to distinguish the corresponding components from other components. It is to be understood that if a component is described as being "connected," "coupled" or "joined" to another component, the former may be directly "connected," "coupled," and "joined" to the latter or "connected", "coupled", and "joined" to the latter via another component.

The same name may be used to describe an element included in any one embodiment and an element having a common function. Unless disclosed to the contrary, the configuration disclosed in any one embodiment may be applied to other embodiments, and the specific description of the repeated configuration will be omitted.

Figure 2A:
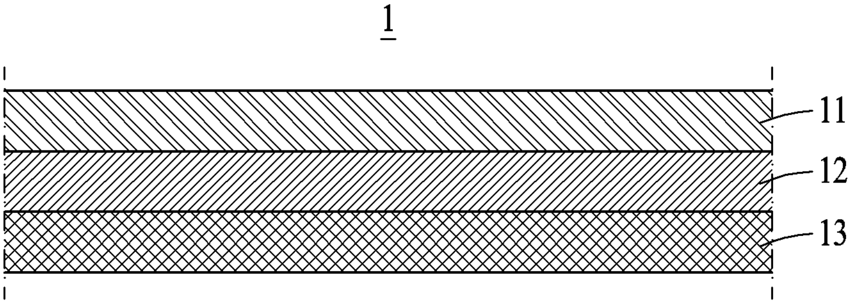
FIG. 2A is a cross-sectional view of a reflector of an antenna according to an embodiment.
Figure 2B:
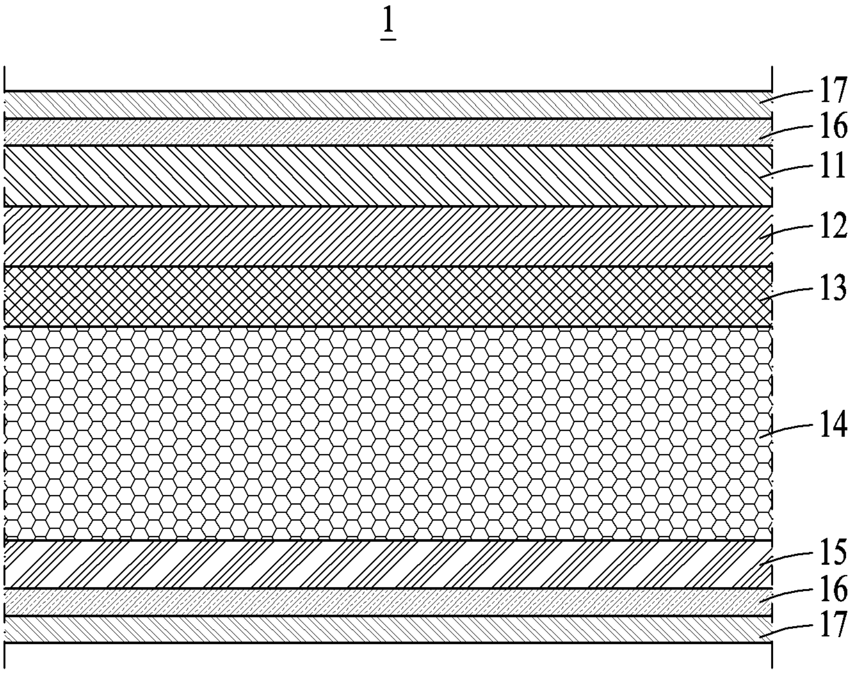
FIG. 2B is a cross-sectional view of a reflector of an antenna according to an embodiment.
Figure 3A:
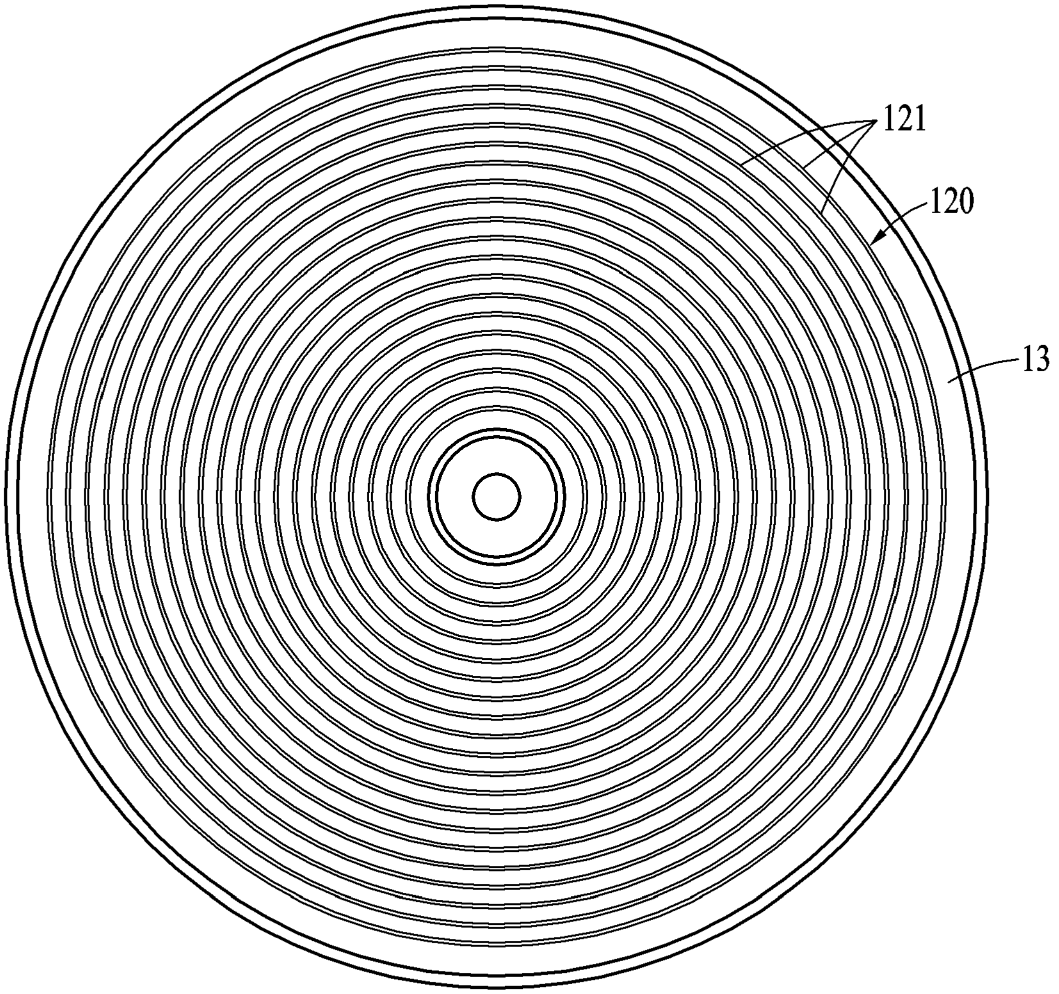
FIG. 3A is a plan view of a reflector including a heating layer of an antenna according to an embodiment.
Figure 3B:
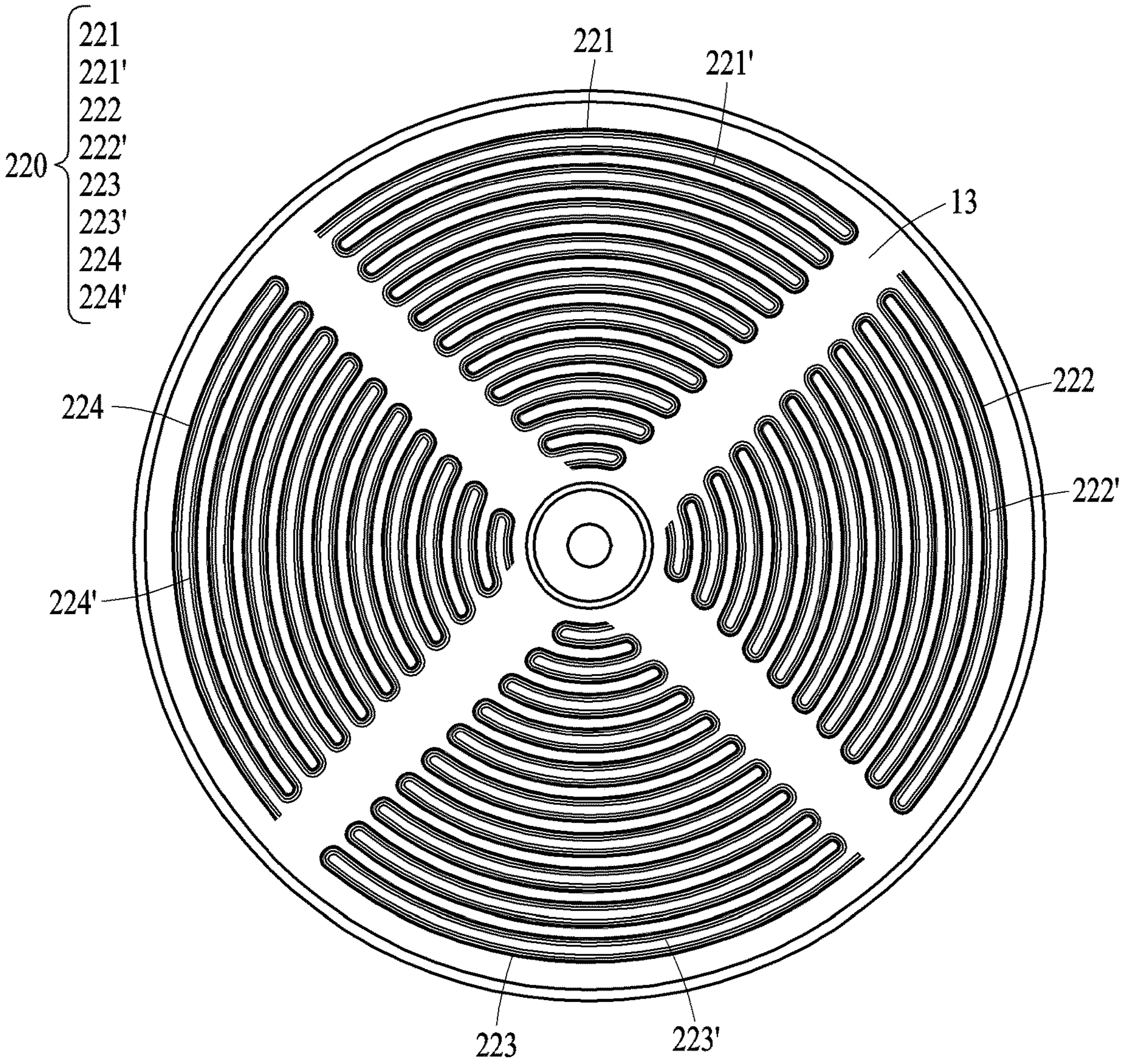
FIG. 3B is a plan view of a reflector including a heating layer of an antenna according to an embodiment including a heating wire portion with a different shape.
Figure 4:
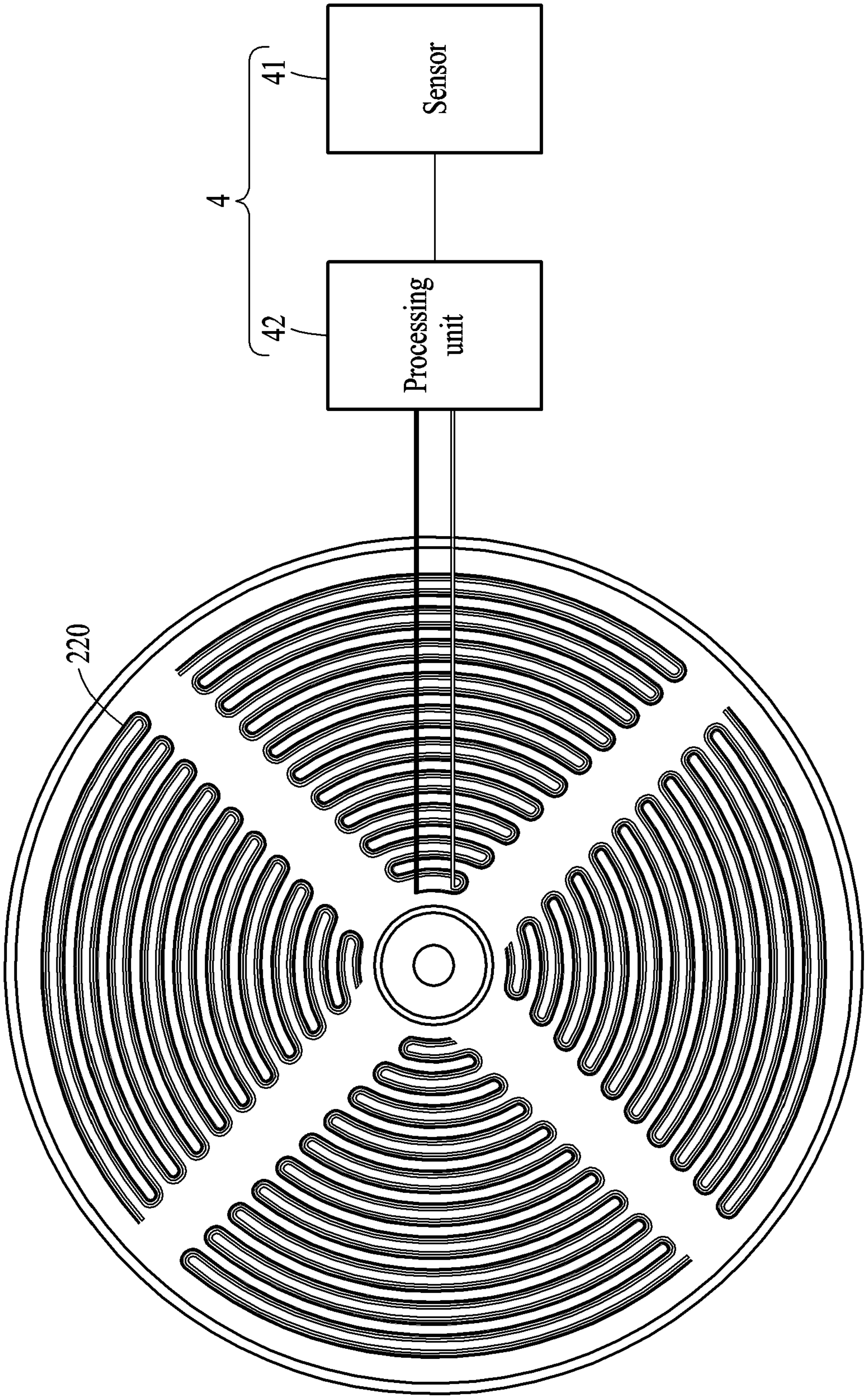
FIG. 4 is a controller of an antenna according to an embodiment including a heating wire portion with a different shape.

FIG. 1 is a perspective view of an antenna 100 according to an embodiment, FIG. 2A is a cross-sectional view of a reflector 1 of the antenna 100 according to an embodiment, FIG. 2B is a cross-sectional view of the reflector 1 of the antenna 100 according to an embodiment, FIG. 3A is a plan view of the reflector 1 including a heating layer 12 of the antenna 100 according to an embodiment, FIG. 3B is a plan view of a reflector including a heating layer of an antenna according to an embodiment including a heating wire portion with a different shape, and FIG. 4 is a controller of an antenna according to an embodiment including a heating wire portion with a different shape.

Referring back to FIG. 1, illustrated is a perspective view of the antenna 100 according to an embodiment. The antenna 100 according to an embodiment may include the reflector 1, a transceiver 2 located on one side of the reflector 1, and a support 3 located on the other side of the reflector 1.

The support 3, which is located at an installation position of the antenna 100 of the ground, a ship, or the like, may locate the reflector 1 at a distance from the installation position. The reflector 1 facing an open space may reflect a radio wave incident on the reflector 1 after the radio wave passes through the open space to allow the transceiver 2 to transmit and receive the radio wave. The curved surface of the reflector 1 may be designed to precisely reflect a radio wave to the transceiver 2 or designed to concentrate a radio wave emitted from the transceiver 2.

However, depending on the weather or an environment, the surface of the reflector 1 facing the open space may accumulate snow S. Moreover, the snow S may repeatedly melt and freeze, forming firmly attached ice S on the surface of the reflector 1.

The reflector 1 of the antenna 100 according to an embodiment may include the heating layer 12 as described below and may thus melt the accumulated snow S or ice S. Therefore, the reflector 1 of the antenna 100 according to an embodiment may maintain the condition of the surface designed to precisely reflect a radio wave even in weather conditions such as heavy snowfall. Thus, an antenna gain may be maintained regardless of adverse weather conditions.

The heating layer 12 of the antenna 100 according to an embodiment is distinct from a radome in that the heating layer 12 melts the accumulated snow S.

Referring to FIG. 2A, illustrated is a cross-sectional view of the reflector 1 of the antenna 100 according to an embodiment. The reflector 1 of the antenna 100 according to an embodiment may include a reflective layer 11, the heating layer 12 located on the lower surface of the reflective layer 11, and an insulating layer 13 located on the lower surface of the heating layer 12.

The reflective layer 11 is a conductive layer that reflects a radio wave of wireless communication and may include materials such as aluminum or carbon. For example, carbon-fiber-reinforced plastic (hereinafter, "CFRP") is a material including carbon.

For example, when the reflective layer 11 includes CFRP as a main material, the coefficient of thermal expansion of the CFRP approaches 0. As a result, even when the temperature of the reflective layer increases due to heat transferred from the heating layer 12, it may be possible to minimize the thermal deformation of the reflective layer.

For example, when the reflective layer 11 includes aluminum as a main material, heat may be rapidly transferred to melt the snow S on the surface of the reflector 1 but the reflective layer 11 may exhibit more pronounced thermal deformation compared to the reflective layer 11 including CFRP as a main material, because aluminum has excellent thermal conductivity but a higher coefficient of thermal expansion compared to CFRP.

Accordingly, an antenna installed in a region with low snowfall and extremely cold temperatures does not necessitate high-temperature heat. Therefore, a material for rapid thermal conductivity may be selected instead. Those skilled in the art may select from various conductive materials with different coefficients of thermal expansion, depending on the desired antenna specifications and purposes.

The heating layer 12 may generate heat produced as a current passes through resistance. The heating layer 12 is located on the lower surface of the reflective layer 11 and may thus conduct the generated heat to the reflective layer 11. This heat increases the temperature of the reflective layer 11 and may thus melt the snow S or ice S on the upper surface of the reflective layer 11. The heating layer 12 is described in detail below.

The insulating layer 13 may allow most of the heat generated in the heating layer 12 to be transferred to the reflective layer 11 located on the upper portion of the heating layer 12. This is done because there is no need to transfer heat below the antenna 100 and the purpose is to transfer heat exclusively to the upper portion on which the reflective layer 11 is located.

In particular, the antenna 100 is installed to face the open space, and the reflective layer 11 faces the open space. Therefore, during heavy snowfall, only the upper portion of the reflector 1, such as the reflective layer 11, accumulates the snow S, while the lower portion of the reflector 1 remains free of snow. Accordingly, there is no need to transfer heat to the lower portion of the reflector 1. Thus, the insulating layer 13 may prevent unnecessary thermal conduction and allow heat to be transferred only to the upper portion of the reflector 1, helping effective deicing.

Meanwhile, a material of the insulating layer 13 may include a material including glass fiber, for example, a core mat, and the like. Glass fiber is a material that is created by extruding glass into thin fibers, has excellent insulation properties, and is easy to be processed. Hence, glass fiber is advantageous as an insulating material.

Particularly, when glass fiber is processed with plastic, such as glass-fiber-reinforced plastic (hereinafter, "GFRP"), the strength of glass fiber may also increase.

Meanwhile, a thin thread of glass fiber is referred to as filament, and depending on the level of further organization, the thin thread of glass fiber is referred to as strand, yarn, or yarn cloth. Meanwhile, when glass fiber is compressed into a fluffy form, it is referred to as wool or mat.

Referring to FIG. 2B, illustrated is a cross-sectional view of the reflector 1 of the antenna 100 according to an embodiment. The reflector 1 of the antenna 100 according to an embodiment illustrated in FIG. 2B is obtained by stacking additional layers on the reflector 1 of the antenna 100 according to an embodiment illustrated in FIG. 2A.

In other words, the reflector 1 of the antenna 100 according to an embodiment may optionally or collectively further include a reinforcement layer 14 that increases the strength of the antenna 100, a first retention layer 15 that maintains the strength and shape of the reinforcement layer 14, upper and lower protective layers 16 that prevent the corrosion and discoloration of the antenna 100, and upper and lower second retention layers 17 that prevent the deformation of the antenna 100 due to an external force.

The reinforcement layer 14 of the antenna 100 according to an embodiment may be located on the lower surface of the insulating layer 13 but may be located in other locations besides the lower surface of the insulating layer 13. As described above, the reinforcement layer may increase the overall strength of the antenna 100.

Furthermore, the reinforcement layer 14 may be implemented as a honeycomb structure. Particularly, a honeycomb structure refers to a grid structure made up of hexagonal column-shaped empty spaces, which may efficiently support weight with a small number of materials.

The first retention layer 15 of the antenna 100 according to an embodiment may be located on the lower surface of the reinforcement layer 14. However, the stacking position is not limited thereto. As described above, the first retention layer may maintain the strength and shape of the reinforcement layer 14.

Particularly, when heat generated in the heating layer 12 causes the heat expansion of other layers such as the reflective layer 11, the first retention layer may prevent the deformation of the antenna 100 and maintain the surface condition of the reflective layer 11, and the like.

In this case, the first retention layer 15 of the antenna 100 according to an embodiment may include a material including glass fiber. Particularly, the material including glass fiber may include a mat or cross-shaped glass fiber.

The upper protective layer 16 of the antenna 100 according to an embodiment may be located on the upper surface of the reflective layer 11, and the lower protective layer 16 of the antenna 100 according to an embodiment may be located on the lower surface of the first retention layer 15. However, the stacking positions are not limited thereto.

As described above, the upper protective layer and the lower protective layer 16 may prevent the corrosion and discoloration of the antenna 100. That is, locating the upper protective layer 16 and the lower protective layer 16 including a material such as gel coat may prevent durability degradation caused by moisture or sunlight. The reflector 1 of the antenna 100 according to an embodiment may optionally include the upper protective layer 16 or the lower protective layer 16 or include both of them.

Particularly, gel coat is a thermosetting gel-phase liquid coating produced by dispersing pigments, thixotropic agents, and the like onto unsaturated polyester resin. When an accelerator and a hardener are added to the gel coat, a double bond in a molecule becomes insoluble and undergoes fluorination through polymerization, resulting in good mechanical/electrical water resistance, weather resistance, oil resistance, and acid resistance. This is why gel coat is widely used for coating.

The upper second retention layer 17 of the antenna 100 according to an embodiment may be located on the upper surface of the upper protective layer 16, and the lower second retention layer 17 of the antenna 100 according to an embodiment may be located on the lower surface of the lower protective layer 16. However, the stacking positions are not limited thereto.

As described above, these retention layers prevent the deformation of the antenna 100 due to an external force. The upper second retention layer 17 and the lower second retention layer 17 may include materials including glass fiber or carbon. For example, they may include CFRP or GFRP.

As described above, CFRP and GFRP have excellent strength. Therefore, the deformation, such as surface modification, of the reflective layer 11, due to thermal expansion, and the like may be prevented together with the reinforcement layer 14.

In conclusion, the reflector 1 of the antenna 100 according to an embodiment may include the heating layer 12 that may melt the snow S on the reflective layer 11 and the insulating layer 13 that allows heat to be transferred only in one direction and may make an effort to improve durability or prevent discoloration of the antenna 100 by optionally including the layer structures additionally described above or including all of them.

Referring to FIG. 3A, illustrated is the heating layer 12 of the antenna 100 according to an embodiment. As described above, the heating layer 12 may be located under the reflective layer 11 and located on the insulating layer 13.

The heating layer 12 of the antenna according to an embodiment may include a heating wire portion 120. The heating wire portion 120 may include heating wires 121 through which currents may flow. When the currents flow through heating wires with resistance, heat may be generated.

Referring to FIG. 3A, the heating wire portion 120 of the antenna 100 according to an embodiment may include the heating wires 121 covering the entire area of the lower surface of the reflective layer 11 and having a plurality of concentric circular shapes.

Each of the heating wires 121 having concentric circular shapes may be connected to each other in parallel. Therefore, even when one of the heating wires 121 having a concentric circular shape is cut off, a current may still flow through the rest of the heating wires 121.

The spacing between the heating wires having concentric circular shapes may be determined by considering the magnitude of power supplied to the heating wire portion 120, within a range typically understood by those skilled in the art.

Referring to FIG. 3B, illustrated are sections of heating wires 221, 222, 223, and 224 and additional heating wires 221', 222', 223', and 224' of the antenna 100 according to an embodiment including a heating wire portion 220 having a different shape.

That is, the heating layer 12 of the antenna 100 according to an embodiment may include the sections of heating wires 221, 222, 223, and 224 as the heating wire portion 220 covering the entire area of the lower portion of the reflective layer 11 and further include the additional heating wires 221', 222', 223', and 224' corresponding to heating wires in case the existing heating wires 221, 222, 223, and 224 are cut off. These additional heating wires 221', 222', 223', and 224' may also apply to the heating wire portion 120 including heating wires with concentric circular shapes.

As illustrated in FIG. 3B, the heating wire portion 220 of the heating layer 12 may include sections including four heating wires 221, 222, 223, and 224. These sections may be formed in a way that divides the heating layer 12 into four equal parts with respect to the central axis. The sections may include the heating wires 221, 222, 223, and 224, respectively, that have circular arc shapes and are arranged around the central axis of the heating layer 12.

That is, starting from the center of the heating layer 12, a circular arc is drawn within a region corresponding to each section. When the circular arc reaches the boundaries of each section, a portion of the circular arc extends outward from the heating layer 12 and then another circular arc is drawn. This process is repeated to form the heating wires 221, 222, 223, and 224. By including the heating wires extending in this zigzag pattern, the heating wire portion 220 may cover the entire area of the lower surface of the reflective layer 11, even when the heating wire portion is divided into sections.

As illustrated in FIG. 3B, the heating wire portion 120 of the heating layer 12 may include the additional heating wires 221', 222', 223', and 224' corresponding to heating wires. The additional heating wires 221', 222', 223', and 224' may be positioned to correspond to the heating wires 221, 222, 223, and 224, which means they may be installed to be spaced apart to one side from the heating wires.

Accordingly, even when the heating wires 221, 222, 223, and 224 are cut off, the additional heating wires 221', 222', 223', and 224' respectively corresponding to a corresponding section generate heat, and thus, heat may still be transferred to the entire area of the reflective layer 11.

Meanwhile, herein, the description is provided mainly based on the antenna 100 according to an embodiment having the heating wire portions 120 and 220. However, a heating layer of an antenna according to another embodiment is not limited thereto and may be configured in various ways.

Particularly, a reflector may include a plate-shaped heating layer of the same size as a reflective layer and include a heating layer that zigzags across the center and circumference of the reflector.

Referring to FIG. 4, illustrated is the antenna 100 further including a controller 4 according to an embodiment. The controller 4 may be electrically connected to the heating layer 12 of the reflector 1 and may control the heating of the heating layer 12.

The controller 4 of the antenna 100 according to an embodiment may include a sensor 41 that measures temperature and a processing unit 42 that performs an operation through data measured by the sensor 41. Using this processing unit 42, it may be possible to control the degree of heating of the heating layer 12 as needed by a user.

For example, after measuring temperature using the sensor 41, electricity may be supplied to the heating layer 12 only when the measured temperature is below a predetermined temperature. Additionally, by controlling the current supplied to the heating layer through the processing unit 42, it may be possible to control the amount of heat generated.

FIG. 4 illustrates that two wires from the processing unit 42 are connected to a single section, one for a heating wire and one for an additional heating wire. However, the controller 4 of the antenna 100 according to an embodiment is not limited thereto. In other words, the processing unit 42 may be individually connected to any section.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents of the claims are within the scope of the following claims.

The invention claimed is:

1. An antenna comprising:

a reflector;

a transceiver located on one side of the reflector; and a support located on another side of the reflector and configured to locate the reflector at a distance from an installation position, wherein the reflector comprises:

a reflective layer configured to reflect an electromagnetic wave;

a heating layer located on a lower surface of the reflective layer and configured to generate heat to be transferred to an upper portion of the reflective layer; and an insulating layer located on a lower surface of the heating layer and configured to prevent the heat generated in the heating layer from being transferred to a lower portion of the heating layer, wherein the heating layer comprises a heating wire portion configured to cover an entire area of the lower surface of the reflective layer, and the heating wire portion comprises a plurality of heating wires arranged in a plurality of concentric arcuate shapes divided into a plurality of sections, wherein each section is a quadrant with respect to the central axis of the reflector.

2. The antenna of claim 1, wherein the reflector further comprises a reinforcement layer located on a lower surface of the insulating layer and configured to increase strength of the antenna.

3. The antenna of claim 2, wherein the reflector further comprises a first retention layer located on a lower surface of the reinforcement layer and configured to maintain strength and a shape of the reinforcement layer.

4. The antenna of claim 3, wherein the reflector further comprises:

an upper protective layer located on an upper surface of the reflective layer and a lower protective layer located on a lower surface of the first retention layer and configured to prevent corrosion and discoloration of the antenna;

an upper second retention layer located on an upper surface of the upper protective layer and configured to prevent deformation of the antenna due to an external force; and a lower second retention layer located on a lower surface of the lower protective layer and configured to prevent deformation of the antenna due to an external force.

5. The antenna of claim 1, wherein the heating wire portion further comprises an additional plurality of heating wires extending along in a spaced relation to the plurality of heating wires.

6. The antenna of claim 1, further comprising:

a controller electrically connected to the heating layer and configured to control heating of the heating layer, wherein the controller comprises:

a sensor configured to measure temperature; and a processing unit configured to perform an operation through data measured by the sensor.

7. An antenna comprising:

a reflector;

a transceiver located on one side of the reflector; and a support located on another side of the reflector and configured to locate the reflector at a distance from an installation position, wherein the reflector comprises:

a reflective layer configured to reflect an electromagnetic wave;

a heating layer located on a lower surface of the reflective layer and configured to generate heat to be transferred to an upper portion of the reflective layer; and an insulating layer located on a lower surface of the heating layer and configured to prevent the heat generated in the heating layer from being transferred to a lower portion of the heating layer, a reinforcement layer located on a lower surface of the insulating layer and configured to increase strength of the antenna, wherein the reinforcement layer has a honeycomb structure, wherein the heating layer comprises a heating wire portion configured to cover an entire area of the lower surface of the reflective layer, and the heating wire portion comprises a plurality of heating wires arranged in a plurality of concentric arcuate shapes divided into a plurality of sections, wherein each section is a quadrant with respect to a central axis of the reflector.

8. The antenna of claim 7, wherein the reflector further comprises a first retention layer located on a lower surface of the reinforcement layer and configured to maintain strength and a shape of the reinforcement layer, wherein the reinforcement layer includes a material including glass fiber.

9. The antenna of claim 8, wherein the material including glass fiber includes a mat or cross-shaped glass fiber.

10. The antenna of claim 8, wherein the reflector further comprises:

an upper protective layer located on an upper surface of the reflective layer and a lower protective layer located on a lower surface of the first retention layer and configured to prevent corrosion and discoloration of the antenna;

an upper second retention layer located on an upper surface of the upper protective layer and configured to prevent deformation of the antenna due to an external force; and a lower second retention layer located on a lower surface of the lower protective layer and configured to prevent deformation of the antenna due to an external force.

* * * * *